United States Patent
He et al.

(10) Patent No.: US 9,471,390 B2
(45) Date of Patent: Oct. 18, 2016

(54) SCHEDULING MAPREDUCE JOBS IN A CLUSTER OF DYNAMICALLY AVAILABLE SERVERS

(71) Applicant: International Business Machines Corporation, Armonk, NY (US)

(72) Inventors: Ting He, Piermont, NY (US); Kang-Won Lee, Nanuet, NY (US); Jian Tan, Wappingers Falls, NY (US); Yuting Ji, Ithica, NY (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 13/742,742

(22) Filed: Jan. 16, 2013

(65) Prior Publication Data

US 2014/0201753 A1 Jul. 17, 2014

(51) Int. Cl.
*G06F 9/46* (2006.01)
*G06F 9/50* (2006.01)

(52) U.S. Cl.
CPC .................... *G06F 9/5066* (2013.01)

(58) Field of Classification Search
None
See application file for complete search history.

(56) References Cited

U.S. PATENT DOCUMENTS

| | | | | |
|---|---|---|---|---|
| 7,321,926 B1* | 1/2008 | Zhang | | G06F 9/5033 455/453 |
| 8,190,610 B2 | 5/2012 | Dasdan et al. | | |
| 8,224,825 B2 | 7/2012 | Wang et al. | | |
| 8,234,652 B2* | 7/2012 | Arimilli | | G06F 9/522 709/226 |
| 8,732,713 B2* | 5/2014 | Coon | | G06F 9/4881 718/102 |
| 8,959,526 B2* | 2/2015 | Kansal | | G06F 9/5077 709/223 |
| 2007/0106994 A1* | 5/2007 | Jackson | | G06F 9/5038 718/104 |
| 2011/0167149 A1 | 7/2011 | Lee et al. | | |
| 2011/0307899 A1 | 12/2011 | Lee et al. | | |
| 2012/0042319 A1 | 2/2012 | Hildrum et al. | | |
| 2012/0110047 A1* | 5/2012 | Hildrum | | G06F 9/4881 708/104 |
| 2012/0191714 A1 | 7/2012 | Datar et al. | | |
| 2012/0192197 A1 | 7/2012 | Doyle et al. | | |
| 2012/0216203 A1 | 8/2012 | Doyle et al. | | |
| 2012/0226639 A1 | 9/2012 | Burdick et al. | | |
| 2014/0033223 A1* | 1/2014 | Swart | | G06F 9/5066 718/105 |

OTHER PUBLICATIONS

Polo, Jordà; Carrera, David; Becerra, Yolanda; Torres, Jordi; Ayguadé, Eduard; Steinder, Malgorzata; Whalley, Ian; Performance-driven task co-scheduling for MapReduce environments; Apr. 2010; 8 pages.*

(Continued)

*Primary Examiner* — H S Sough
*Assistant Examiner* — Kimberly Jordan
(74) *Attorney, Agent, or Firm* — Scully, Scott, Murphy & Presser PC; Preston J. Young, Esq.

(57) ABSTRACT

There is provided a method, a system and a computer program product for improving performance and fairness in sharing a cluster of dynamically available computing resources among multiple jobs. The system collects at least one parameter associated with availability of a plurality of computing resources. The system calculates, based on the collected parameter, an effective processing time each computing resource can provide to each job. The system allocates, based on the calculated effective processing time, the computing resources to the multiple jobs, whereby the multiple jobs are completed at a same time or an approximate time.

16 Claims, 8 Drawing Sheets

(56) References Cited

OTHER PUBLICATIONS

Cherkasova, et al., "Two Sides of a Coin: Optimizing the Schedule of MapReduce Jobs to Minimize Their Makespan and Improve Cluster Performance", HP Laboratories, Jun. 2012, pp. 1-13.
Michiardi, et al., "Shared Cluster Scheduling: a Fair and Efficient Protocol", LADIS ACM, Seatle, Jun. 2011, pp. 1-5.
IP.Com et al.; "Optimizing MapReduce Scheduling At The Task-Level", IPCOM000217108D, May 2012.
IP.Com et al.; "Workload Optimization Through Dynamic Reconfiguration Of Compute Nodes", IPCOM000215416D, Feb. 2012.
Zaharia, et al., "Improving MapReduce Performance in Heterogeneous Environments", 8th USENIX Symposium on Operating Systems Design and Implementation, 2008, pp. 29-42.
Zaharia, et al., "Job Scheduling for Multi-User MapReduce Clusters", Electrical Engineering and Computer Sciences University of California at Berkeley, Apr. 2009.
Ahmad, et al., "Tarazu: Optimizing MapReduce On Heterogeneous Clusters", ASPLOS'12, Mar. 2012.
You, et al., "A Load-Aware Scheduler for MapReduce Framework in Heterogeneous Cloud Environments" SAC'11, Mar. 2011.
Lee, et al., "Heterogeneity-Aware Resource Allocation and Scheduling in the Cloud", HotCloud'11 Proceedings of the 3rd USENIX conference on Hot topics in cloud computing, 2011.
Lin, et al., "MOON: MapReduce On Opportunistic eNvironments", HPDC '10 Proceedings of the 19th ACM International Symposium on High Performance Distributed Computing, Nov. 2010.
Kalekar, et al., "Time series Forecasting using Holt-Winters Exponential Smoothing", Kanwal Rekhi School of Information Technology, Dec. 2004.

* cited by examiner

SCHEDULING MAPREDUCE JOBS IN A CLUSTER OF DYNAMICALLY AVAILABLE SERVERS

GOVERNMENT CONTRACT

This invention was Government support under Contract No. 60NANB10D003 awarded by National Institute of Standards and Technology. The Government has certain rights in this invention.

BACKGROUND

This disclosure relates generally to MapReduce programming model, and particularly to a scheduler used in MapReduce programming model that has heterogeneous computing nodes.

BACKGROUND OF THE INVENTION

MapReduce is a programming model used for processing large amount of data (e.g., petabytes or terabytes) in clusters of hardware servers. MapReduce divides each job into multiple Map tasks and Reduce tasks, so that map/reduce phase can each progress in parallel, speeding up completion of the job. Examples of Map task include, but are not limited to: emitting a line on an output pattern upon finding a match with a supplied pattern and an input pattern, processing of logs of web pages and their URL, outputting a URL found in another web page, etc. Examples of corresponding Reduce task include, but are not limited to: copying a supplied intermediary data to an output, adding of all values corresponding to a single URL (Uniform Resource Locator), concatenating all URL listed in a web page, etc. Performance of MapReduce clusters crucially depends on its scheduling mechanism, which decides when and where to run each task of each submitted job.

Figure 1:
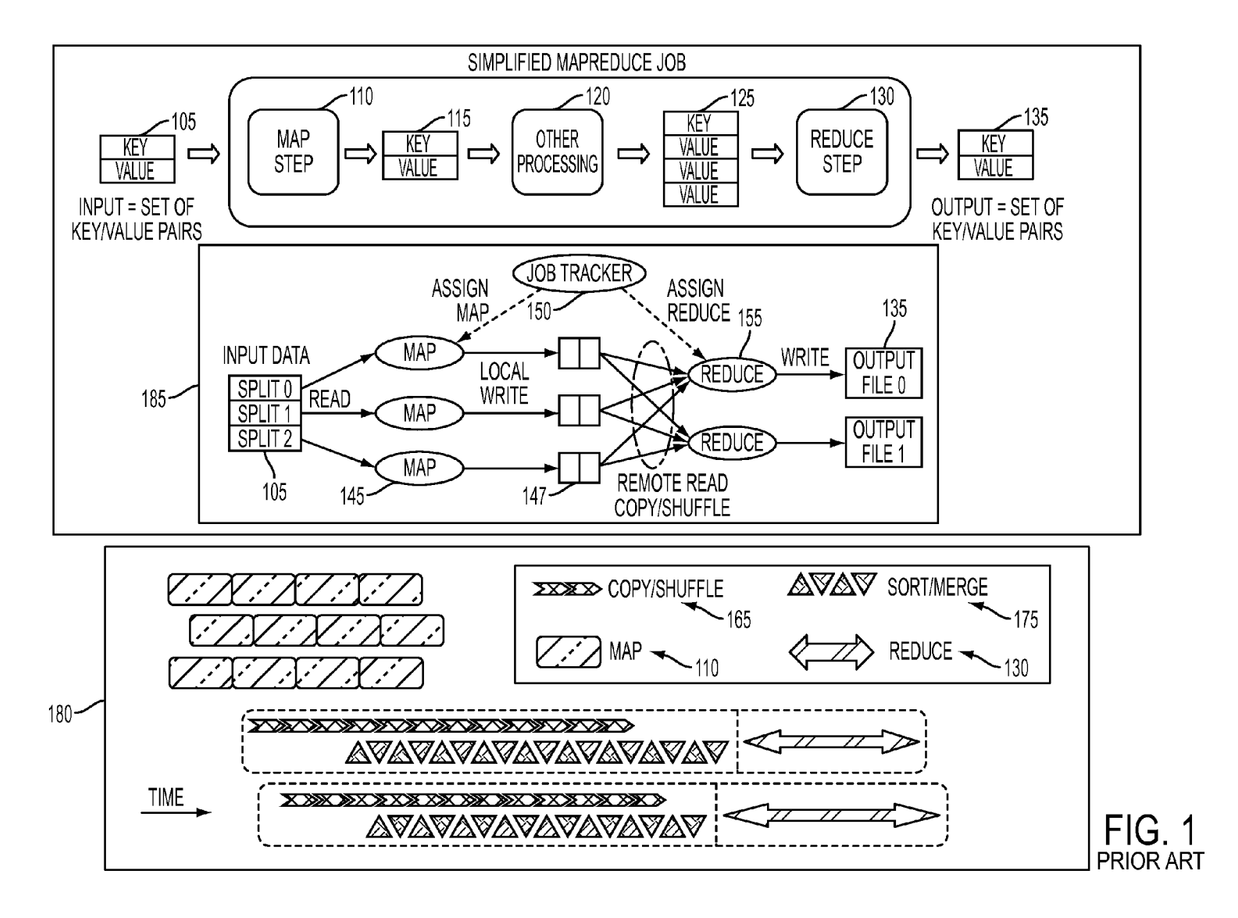
FIG. 1 illustrates an operation of MapReduce programming model.

FIG. 1 illustrates an operation in MapReduce programming model running on a cluster of computing systems. In MapReduce programming model, an input data 105 is a set of key and value pairs. MapReduce programming model includes four phases: a Map phase 110, a Shuffle (or copy) phase 165, a Sort (or Merge) phase 175, and a Reduce phase 130. As shown in a graphical box 180 in FIG. 1, Map phase 110, Shuffle phase 165, Sort phase 175 and Reduce phase 130 may run in parallel or in serial. Map phase 110 receives a set of key and value pairs as an input 105. Map phase 110 generates intermediate key and value tuples 115. Shuffle phase 165 performs a communication for exchanging of data, e.g., the generated intermediate key and value tuples. In Shuffle phase 165, all tuples for a specific key are sent to a Reducer, i.e., a computing node performing Reduce phase 130. Sort phase 175 arranges tuples according to their keys, e.g., by grouping 125 values that have a same key. "Other processing" 120 in FIG. 1 refers to Shuffle phase 165 and Sort phase 175. Reduce phase 130 processes the arranged tuples for a key and generates an output 135, which is a set of key and value pairs.

A graphical box 185 in FIG. 1 also illustrates an operation of a MapReduce programming model. In MapReduce programming model, each job includes at least two tasks (or functions): Map task (or function) and Reduce task (or function). Upon receiving the input data 105, MapReduce programming model divides the input data into multiple splits. A master computing node 150, called JobTracker, assigns computing nodes, called Mappers 145, to these splits. A Mapper refers to a computing node that performs

2

Map task. An assigned Mapper 145 reads a corresponding split, parses the read split, and writes its output 147, e.g., intermediate key and value pairs, into its local storage device, e.g., a local disk storage device. JobTracker 150 assigns computing nodes, called Reducers 155, to process these intermediate key and value pairs. A Reducer refers to a computing node that performs Reduce task. A Reducer 155 reads these intermediate key and value pairs, e.g., from at least one remote local storage device of one or more Mappers 145, shuffles and sorts these pairs in order to aggregate values corresponding to a same key, processes the aggregated values, and outputs a file 135, e.g., one or more key and value pairs.

Figure 2:
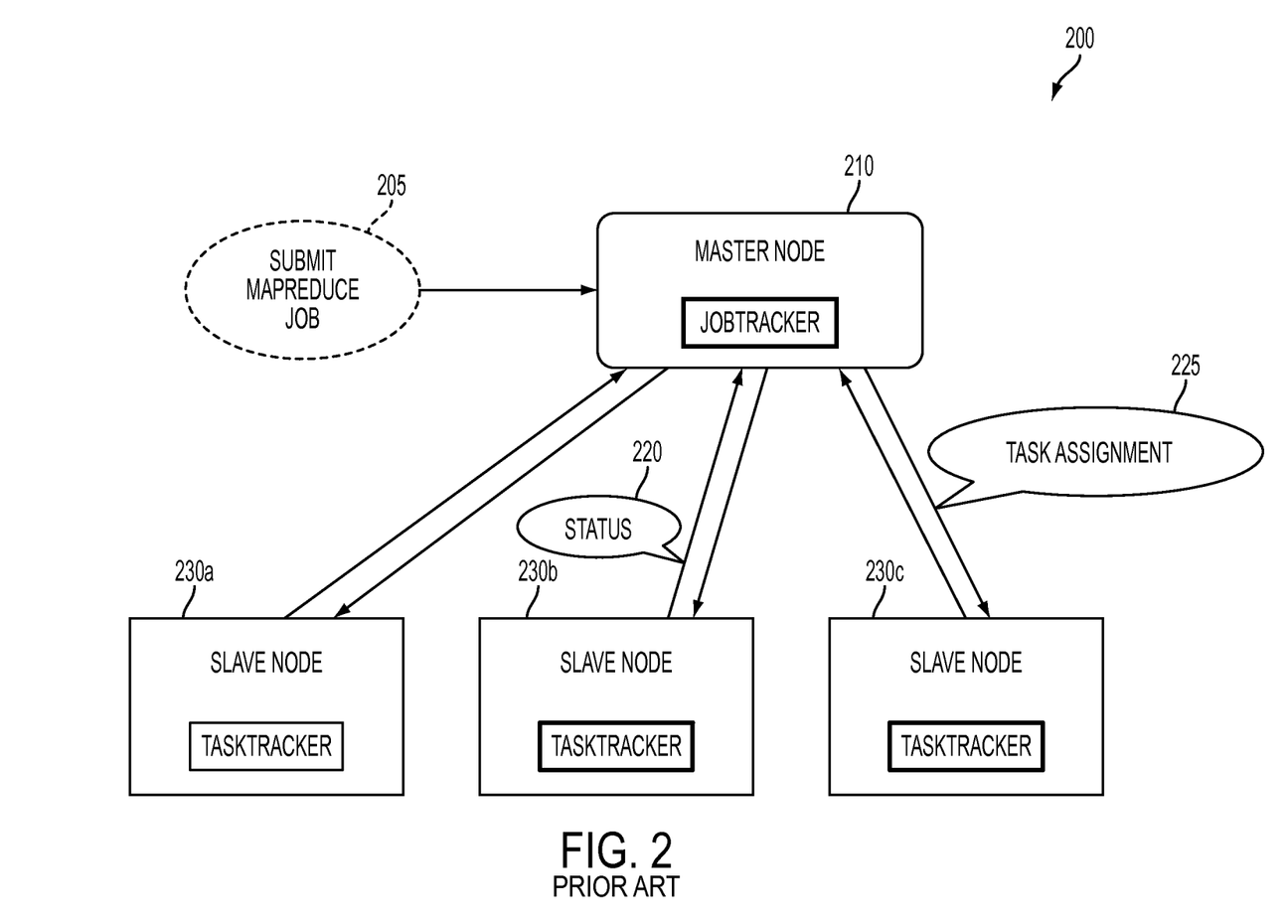
FIG. 2 illustrates a traditional system diagram of MapReduce programming model.

FIG. 2 illustrates a traditional system diagram 200 of MapReduce programming model. A user submits 205 MapReduce jobs to a master computing node 210, also called JobTracker. JobTracker 210 distributes 225 these jobs to slave computing nodes, also called TaskTracker 230a-230c. JobTracker 210 assigns these jobs to TaskTracker 230a-230c in response to status messages 220 periodically sent from TaskTracker 230a-230c. Status messages 220 include, but are not limited to: available or unavailable processing periods of a corresponding computing resource, the number of Map task processed at a corresponding computing resource, the number of Reduce task processed at a corresponding computing resource, etc.

In order to provide fault tolerance feature, when JobTracker has not received a status message from a particular TaskTracker for a pre-determined time period, e.g., 10 minutes, JobTracker determines that the particular TaskTracker has failed. Then, JobTracker re-assigns jobs running on the failed TaskTracker to other TaskTracker. This re-assignment of jobs due to a failure or a poor performance of a computing node is called speculative task processing. A traditional system of MapReduce programming model assumes that TaskTrackers are homogeneous, i.e., every TaskTracker has an identical computing capability. A known JobTracker of this traditional MapReduce system aims to balance the number of processing slots taken by each job.

However, in reality, a cluster of hardware servers usually include heterogeneous computing nodes, each of which has different computing capability. Even if a cluster of hardware severs comprises homogenous computing nodes, that cluster of hardware servers may support both interactive applications (e.g., on-line web store, etc.) and analytics applications run on MapReduce programming model. Interactive applications may run on on-demand virtual machines. On the other hand, MapReduce analytics application may run on spot-like virtual machines which do not require real-time computation capability.

Due to a higher priority of those interactive applications, MapReduce jobs in such cluster of homogenous hardware servers face dynamic changes in available server resources: states of hardware server vary between "available" and "unavailable" as interactive application workloads arrive/leave or increase/decrease. "Available" state of a hardware server refers to that a corresponding hardware server can process at least one MapReduce job. "Unavailable" state of a hardware server refers to that a corresponding hardware server cannot process any MapReduce job.

Interruptions induced by higher-priority interactive applications imply that each identical hardware server may deliver different processing speed and different computing capability to identical MapReduce jobs. Interfering workloads, e.g., interactive application workloads, may be different on each identical hardware server. Therefore, merely balancing the number of processing slots per job appears to be insufficient to ensure truly fair and efficient sharing of a practical cluster of hardware servers under interfering workloads.

SUMMARY

There is provided a system for improving performance and fairness in sharing a cluster of dynamically available computing resources among multiple jobs. The system collects at least one parameter associated with availability of a plurality of computing resources. The system calculates, based on the collected parameter, an effective processing time each computing resource can provide to each job. The system allocates, based on the calculated effective processing time, the computing resources to the multiple jobs, whereby the multiple jobs are completed at a same time or an approximate time.

In order to calculate the effective processing time, the system assigns a weight to each processing slot in each computing resource based on processing speed of the each computing resource. The system further measures a fraction of available time of the each computing resource for processing a job during a lifetime of the job.

There is provided a system for scheduling jobs. The system calculates a correlation across a plurality of computing resources. The system assigns, according the calculated correlation, the jobs to the computing resources.

The correlation includes: a fraction of simultaneously available times of every pair of the plurality of computing resources.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 8:
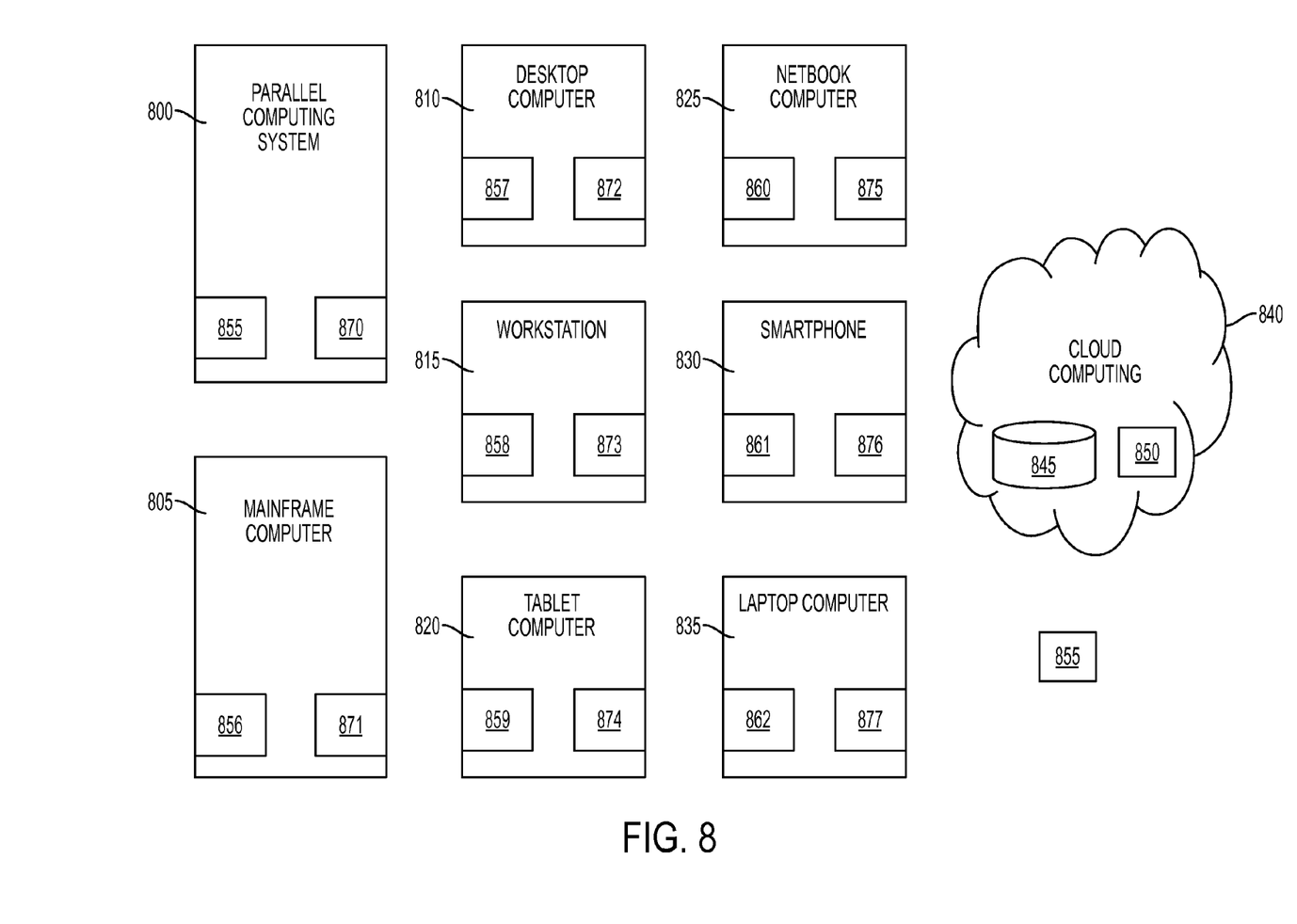
FIG. 8 illustrates exemplary computing nodes that can be used in a cluster of hardware servers.

This disclosure describes new scheduling method, system and computer program product that improve performance and fairness in sharing a cluster of dynamically available computing resources, e.g., hardware server computers, among multiple MapReduce jobs. FIG. 8 illustrates exemplary computing resources: a parallel computing system 800 including at least one processor 855 and at least one memory device 870, a mainframe computer 805 including at least one processor 856 and at least one memory device 871, a desktop computer 810 including at least one processor 857 and at least one memory device 872, a workstation 815 including at least one processor 858 and at least one memory device 873, a tablet computer 820 including at least one processor 856 and at least one memory device 874, a netbook computer 825 including at least one processor 860 and at least one memory device 875, a smartphone 830 including at least one processor 861 and at least one memory device 876, a laptop computer 835 including at least one processor 862 and at least one memory device 877, or a cloud computing system 840 including at least one storage device 845 and at least one server device 850.

In this disclosure, a job refers to a MapReduce job, which includes at least one Map task and at least one Reduce task. Examples of Map task and Reduce task are described above.

Figure 3:
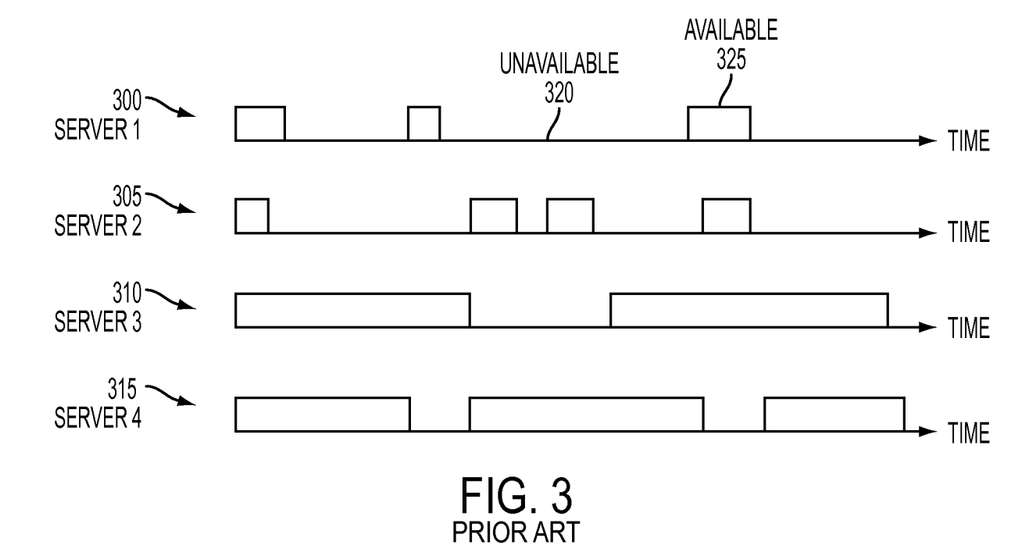
FIG. 3 illustrates available and unavailable processing slots of hardware servers.

As mentioned above, even if raw processing speeds of all computing resources are identical, different interfering workloads on different computing resources will lead to variations in their actual speeds in processing of MapReduce jobs. Assume a situation where interfering workloads belong to high-priority applications, which interrupt MapReduce jobs. Then, as shown in FIG. 3, each computing resource, e.g., a hardware server computer 1 (300), a hardware server computer 2 (305), a hardware server computer 3 (310), a hardware server computer 4 (315), has interleaving "available" periods 325 and "unavailable" periods 320. Each available period 325 corresponds to an idle or lightly-loaded period of a corresponding computing resource, and each unavailable period 320 corresponds to a busy period of a corresponding computing resource.

Figure 4A:
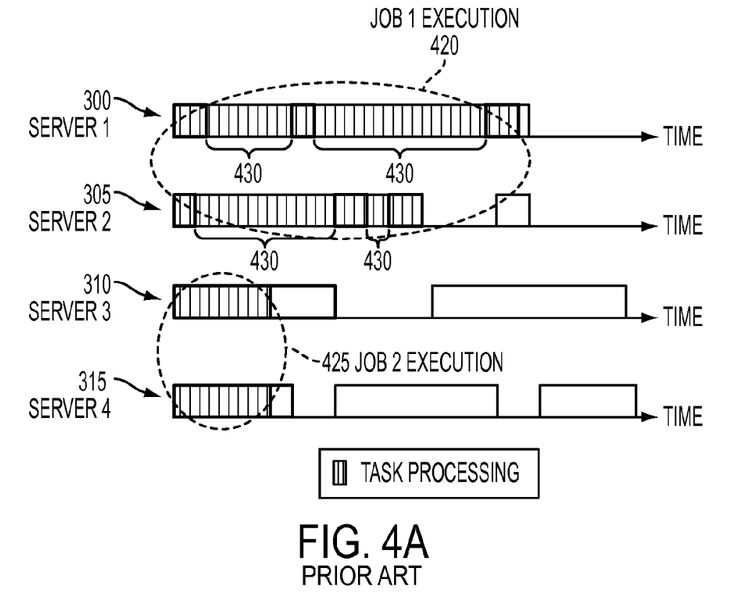
FIGS. 4A-4B illustrate the difference between the traditional MapReduce job scheduler and a MapReduce job scheduler based on effective processing time.

First, consider scheduling of Map tasks. Suppose that two jobs with similar workload arrive simultaneously at time 0, each with two Map tasks and one Reduce task. Furthermore, suppose that each computing resource has one Map slot (i.e., a processing slot for computing Map tasks) and one Reduce slot (i.e., a processing slot for computing Reduce tasks). A currently known scheduler, e.g., FAIR scheduler, etc., merely divides the total number of processing slots equally between the two jobs. Matei Zaharia, et al., "Job Scheduling for Multi-User MapReduce Clusters," Technical Report No. UCB/EECS-2009-55, University of California at Berkeley, Apr. 30, 2009, wholly incorporated by reference as if set forth here, describes the FAIR scheduler in detail. For example, as shown in FIG. 4A, this currently known scheduler may give the Map slots on the hardware server computers 1 (300) and 2 (305) to job 1 (420), and Map slots on hardware server computers 3 (310) and 4 (315) to job 2 (425). However, this allocation depicted in FIG. 4A is unfair to job 1 because its Map slots reside on "slow" hardware server computers due to extended unavailable periods 430. Thus, job 1 finishes Map phase much later than job 2, as shown in FIG. 4A.

Figure 7A:
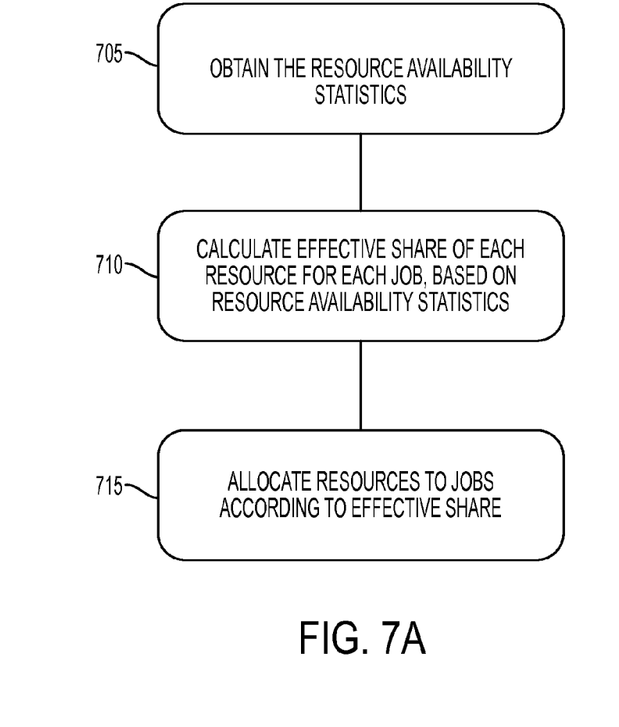
FIGS. 7A-7B illustrate flow charts that describe method steps of scheduling of MapReduce jobs according to effective processing time and a correlation between computing nodes.

FIG. 7A illustrates a flow chart that depicts method steps for improving performance and fairness in sharing a cluster of dynamically available computing resources among multiple MapReduce jobs. At step 705, a MapReduce job scheduler (MapReduce job scheduler 855 shown in FIG. 8) collects run-time availability parameters of computing resources from distributed monitoring agents, e.g., Ping command, etc., on those computing resources. The MapReduce job scheduler would be implemented by one or more of: the parallel computing system 800, the mainframe computer 805, the desktop computer 810, the workstation 815, the tablet computer 820, the netbook computer 825, the smartphone 830, the laptop computer 835, the cloud computing system 840, shown in FIG. 8.

Those collected available parameters include, but are not limited to: long-term (e.g., a month, etc.) availability of each computing resource, instantaneous availability of each computing resource, an average available period of each computing resource, an average unavailable period of each computing resource. The MapReduce job scheduler then uses one or more of these collected parameters to schedule Map tasks and Reduce tasks so that: (i) effective processing time received by each job is same or approximate (e.g., a difference is less 1 minute) across all jobs; (ii) an average job completion time is minimized by jointly scheduling of Map tasks and Reduce tasks of a job.

Returning to FIG. 7A, at step 710, in order to make effective processing time equal or approximate across all jobs, the MapReduce scheduler first calculates effective processing time that each computing resource can provide to each job. The calculation of effective processing time includes, but is not limited to: (1) assigning a weight to each processing slot in a computing resource based on processing speed of that computing resource; and (2) measuring a fraction of available time of that computing resource for processing a job during lifetime of that job. For example, according to effective processing time, two processing slots on a hardware server computer that are only 50% available are equivalent to one processing slot on that hardware server computer that is 100% available. At step 715, the MapReduce scheduler allocates, based on the calculated effective processing time, those computing resources to jobs, whereby jobs with similar or identical workloads are completed at a same time or an approximate time.

In one embodiment, in order to allocate the computing resources to those jobs whose workloads are similar or identical, the MapReduce job scheduler determines, among the computing resources, at least one computing resource whose performance is lower than a pre-determined standard. The pre-determine standard includes, but is not limited to: a specific number of available processing slots in a computing resource, a specific computing capability of a computing resource, a specific percentage of available processing slots over total processing slots in a computing resource, a specific processing speed of a computing resource, etc. The MapReduce job scheduler determines, among the computing resources, at least one computing resource whose performance is higher than the pre-determined standard. The MapReduce job scheduler assigns a mix of the low-performance computing resources and the high-performance computing resources to each job to make each job receive equal amount of effective processing time.

In one embodiment, in order to allocate the computing resources to those jobs whose workloads are similar or identical, the MapReduce job scheduler assigns a weight to each job. The MapReduce job scheduler distributes the computing resources to each job in order to maximize a minimum normalized processing time across all those jobs. The MapReduce job scheduler calculates a minimum normalized processing time by dividing a processing time given to a corresponding job by a weight assigned to the corresponding job. For example, jobs have corresponding weights reflecting their importance. One or more users may determine weights of these jobs, e.g., based on how much those users pay for a Cloud Computing Service for computing each job. If a job 1 has a weight $w_1$, a job 2 has a weight $W_2$, . . . , a job n has a weight $w_n$, the MapReduce job scheduler attempts to allocate processing times $s_1, s_2,$ . . . , $s_n$ to each job so that $s_i/w_i$ (the minimum normalized processing time) among all jobs i=1, . . . , n is maximized.

In a further embodiment, the MapReduce job scheduler repeats (not shown) steps 705-715 in FIG. 7A in order to maximize fairness across the jobs. Fairness refers to that a sum of the calculated effective processing time given to a job is equal for all jobs.

Figure 4B:
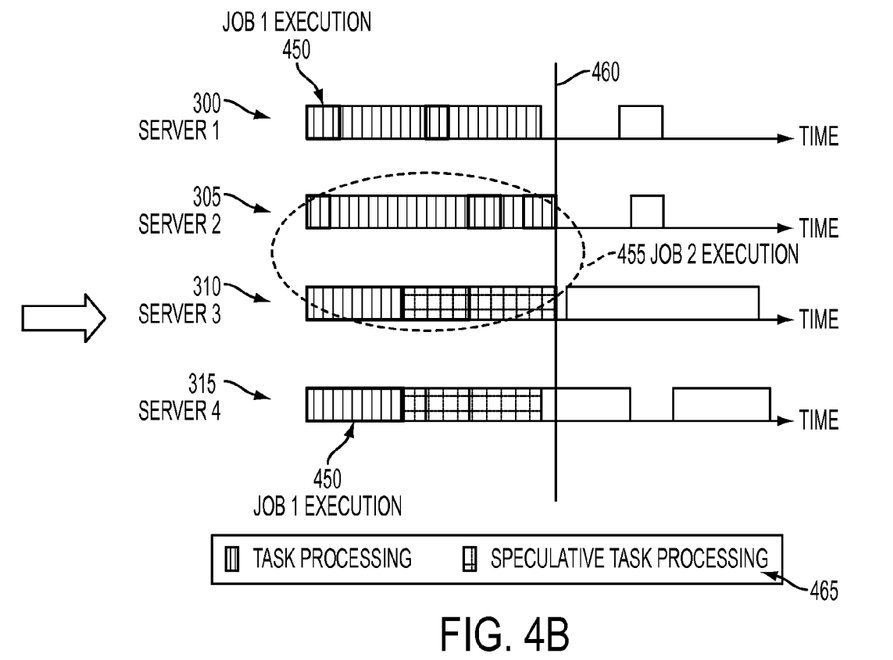

The MapReduce job scheduler weighs processing slots in each computing resource by an effective processing speed of the computing resource, e.g., measured by a fraction of available processing slots over total processing slots. Each job with similar workload will be assigned to a high-performance computing resource (e.g., hardware server computer 3 (310), etc.) and a low-performance computing resource (e.g., hardware server computer 1 (300), etc.), as shown in FIG. 4B. In FIG. 4B, the MapReduce job scheduler assigns jobs with similar workload to a mix of a high-performance computing resource and a low-performance computing resource in order for the jobs to receive equal amount of effective processing times and to be completed at a same time or at an approximate time. Job 1 (450) is assigned to hardware server computers 1 (300) and 4 (315). Job 2 (455) is assigned to hardware server computers 2 (305) and 3 (310). Job 1 (450) and Job 2 (455) are completed at an approximate time 460. Therefore, this schedule shown in FIG. 4B yields much fairer map-phase completion times when compared to the schedule shown in FIG. 4A. Note that if tasks of a same job have different completion times, e.g., due to a combination of high-performance and low-performance computing resources assigned to a task, an inherent fault-tolerance mechanism of MapReduce will launch a backup processing of slow tasks, called speculative task processing 465, as shown in FIG. 4B. A task is considered complete when any one of its processings (i.e., original processing and backup processing) completes.

Regarding the joint scheduling of Map task and Reduce task, an intuition is that since a Reduce task can only make progress when a computing resource processing that Reduce task is simultaneously available with a computing resource processing of Map tasks of the same job (during Shuffle phase), scheduling Reduce tasks on a computing resource(s) whose available processing times are positively correlated (i.e., more simultaneously available) with those of Map tasks can improve performance, e.g., completion time of that job.

Figure 5:
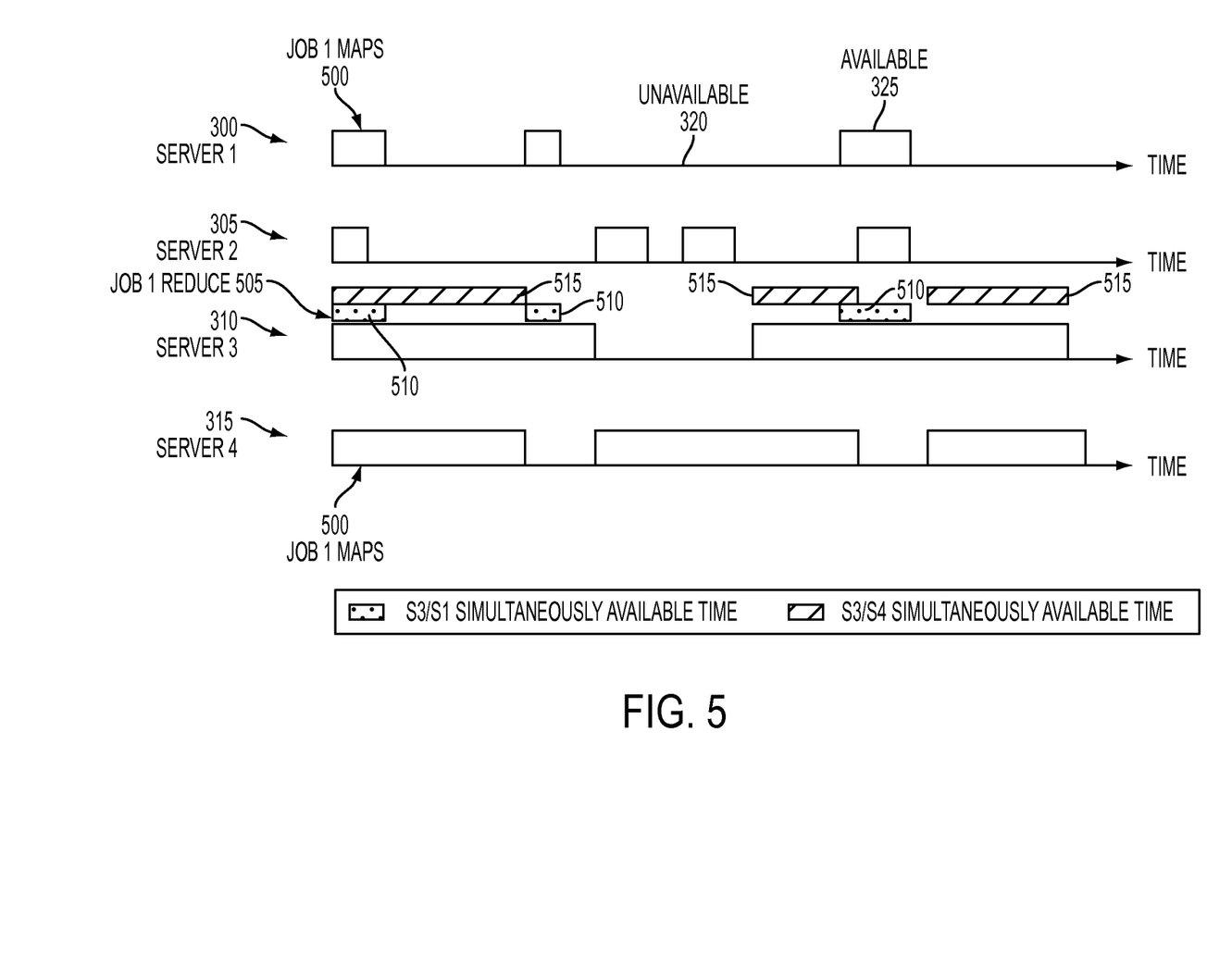
FIG. 5 illustrates scheduling of MapReduce jobs based on a correlation between computing nodes.

Due to synchronization between Map and Reduce tasks during the Shuffle phase, a Reduce task can only proceed with fetching of data from a Map task when both corresponding computing resources are available. An effective reduce slot refers to a processing slot for Reduce task which is simultaneously available with a processing slot of a corresponding Map task. An effective reduce slot is measured by an average fraction of time that a computing resource(s) hosting a Reduce task is simultaneously available with a computing resource(s) hosting a corresponding Map task as shown in effective reduce slots 510-515 in FIG. 5. In FIG. 5, suppose that Map tasks 500 of job 1 are scheduled on the hardware server computers 1 (300) and 4 (315), and a Reduce task 505 of job 1 is scheduled on the hardware server computer 3 (310). The hardware server computer 3 (310) hosting the Reduce task 505 can fetch results from the hardware server computer 1 (300) hosting the Map task 500 when the hardware server computers 1 (300) and 3 (310) are simultaneously available 510. Similarly, the hardware server computer 3 (310) hosting the Reduce task 505 can fetch results from the hardware server computer 4 (315) hosting the Map task 500 when the hardware server computers 1 (300) and 4 (315) are simultaneously available 515. The effective reduce slot is then represented by the average of the fractions of time that the hardware server computers 1 (300) and 3 (310), or the hardware server computers 3 (310) and 4 (315), are simultaneously available 510-515. Placements of Map and Reduce tasks on computing resources jointly determines effective reduce slots.

Figure 7B:
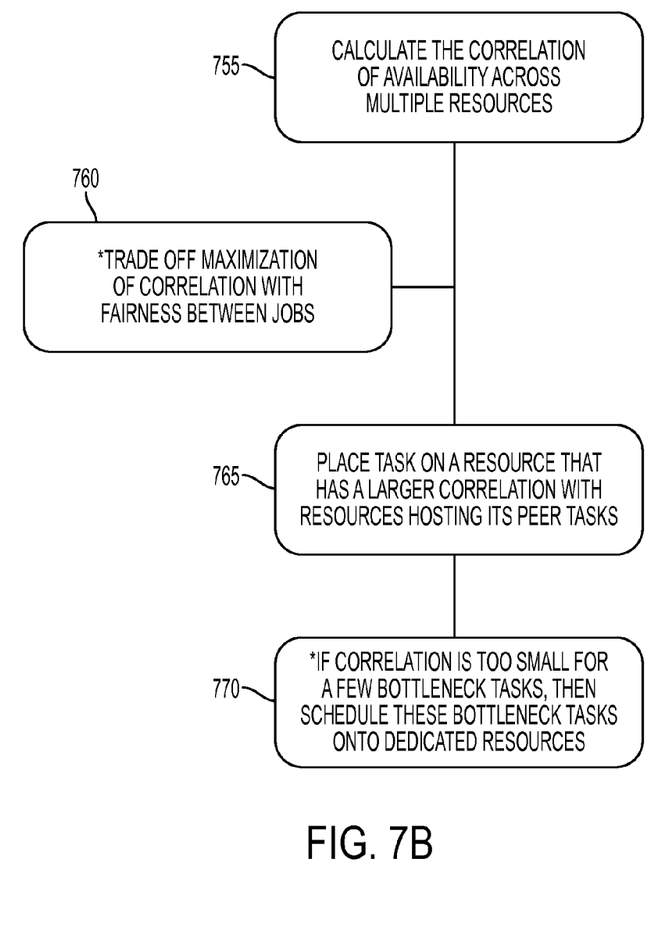

FIG. 7B illustrates scheduling of jobs according to simultaneous availability of processing slots between computing resources in order to expedite the Shuffle phase. (Shuffle phase is described above in detail above.) At step 755, the MapReduce job scheduler calculates a correlation across computing resources. The correlation includes, but is not limited to: a fraction of simultaneously available times of those computing resources. At step 760, the MapReduce job scheduler calculates effective processing time of the computing resources, as described above. Assigning the jobs according to the calculated correlation may be traded off with the fairness of the calculated effect processing time across the jobs. In other words, maximizing effective reduce slots across jobs may make jobs with similar workloads receive different amount of effective processing times. At step 765, the MapReduce job scheduler assigns, according to the calculated correlations, jobs to those computing resources. In one embodiment, a job is assigned to computing resources whose simultaneous available time is maximum when the job is available to be assigned. At step 770, if the calculated correlation between those computing resources are too small, e.g., the number of simultaneously available processing slots of those computing resources is just one, the MapReduce job scheduler assigns bottleneck tasks, e.g., Reduce tasks, to computing resources dedicated to process only Reduce tasks.

The MapReduce job scheduler prefers an allocation of jobs in which more jobs have positively correlated map/reduce slots (in terms of simultaneous availability of computing resources) over another allocation of jobs where fewer jobs have such positive correlation, even if a relative fairness in terms of effective processing times are same. "Positively correlated map/reduce slots" refers to that there are a maximum or nearly maximum number of simultaneously available processing slots between processing slots for Map task and processing slots for Reduce task.

Figure 6:
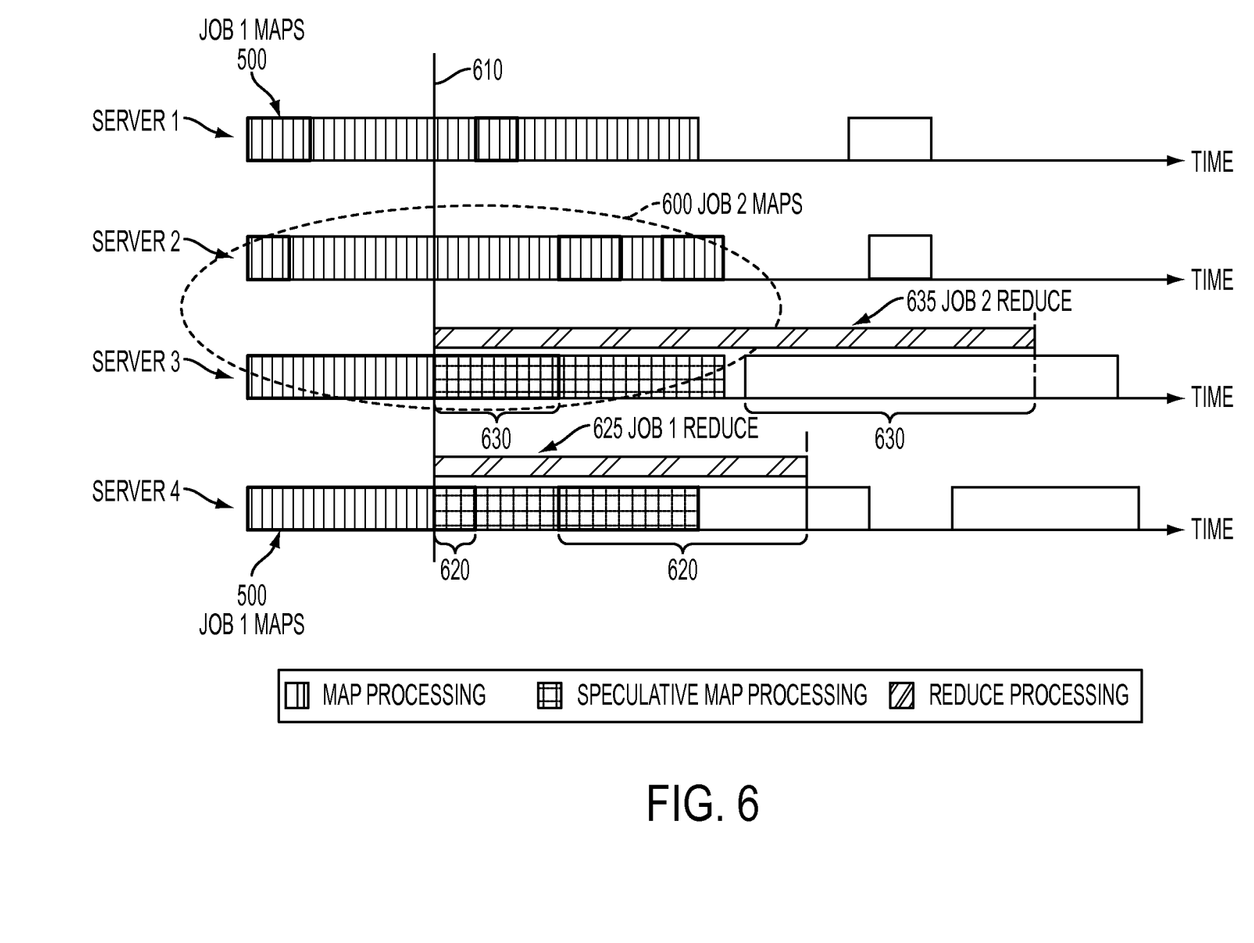
FIG. 6 illustrates scheduling of MapReduce jobs based on effective processing time and a correlation between computing nodes.

Different combinations of computing resources for hosting Map and Reduce tasks will yield different total effective reduce slots. Placing of a Reduce task on a computing resource which is more synchronized with (i.e., positively correlated) another computing resource hosting a corresponding Map task accelerates the Shuffle phase. In contrast, placing of Reduce task on a computing resource(s) negatively correlated (i.e., hardly synchronized) with other computing resource(s) hosting a corresponding Map task(s) will slow down the Shuffle phase. Under fairness constraint, e.g., the sum of effective reduce slots is roughly the same for all jobs, the MapReduce job scheduler schedules Reduce tasks in order to maximize total effective reduce slots received by all jobs and thus to improve the average job completion time of all jobs, e.g., by accelerating Shuffle phase of all jobs. In one embodiment, in order to schedule MapReduce jobs under fairness constraint, the MapReduce job scheduler schedules those MapReduce jobs according to method steps in FIG. 7A. Under efficiency constraint, e.g., the total effective reduce slots is within a certain distance of the maximum total effective reduce slots, the MapReduce job scheduler schedules Map and Reduce tasks to balance the sum of effective reduce slots between jobs. In one embodiment, in order to schedule MapReduce jobs under efficiency constraint, the MapReduce job scheduler schedules those MapReduce jobs according to method steps in FIG. 7B. In one embodiment, the MapReduce job scheduler may schedule jobs under both the fairness constraint and the efficiency constraint. A possible schedule for the jobs under the combination of the fairness constraint and the efficiency constraint is shown in FIG. 6. In FIG. 6, the hardware server computers 1 and 4 are assigned to process Map task 500 of job 1. The hardware server computers 2 and 3 are assigned to process Map task 600 of job 2. The hardware server computer 4 is further assigned to process Reduce task of job 1. The hardware server computer 3 is further assigned to process Reduce task of job 2. This assignment shown in FIG. 6 achieves that Map task 500 of job 1 and Map task 600 of job 2 are completed at a same time 610. FIG. 6 further shows that effective reduce slots 620 of job 1 and effective reduce slots 630 of job 2 are approximate. Specifically, the effective reduce slots 620 of job 1 are time periods in which Reduce task 625 of job 1 runs and at the same time when the hardware server computer 4 is available. Note that these time periods do not need to be continuous. The effective reduce slots 630 of job 2 are time periods in which Reduce task 635 of job 2 runs and at the same time when the hardware server computer 3 is available. Note that these time periods do not need to be continuous.

Processing speed of a computing resource in processing tasks is directly proportional to the computer resource's long-term (e.g., a month, etc.) fraction of available processing time. In order to determine processing speeds of computing resources, the MapReduce job scheduler considers one or more parameters including, but not limited to: long-term availability of those computing resources, instantaneous availability of those computing resources, an average available period of the computing resources, an average unavailable period of the computing resources, processing time per task, etc. The MapReduce job scheduler obtains these parameters, e.g., by using Ping command, etc.

In a further embodiment, the MapReduce job scheduler measures long-term average availability and long-term correlation of computing resources in order to allocate long-running (e.g., processing time is longer than one day) jobs to those computing resources. In order to allocate short-running (e.g., processing time is less than a day) jobs to those computing resources, the MapReduce job scheduler uses adaptive measures, e.g., average availability of each computing resource and correlation between computing resources in a finite time window and/or computing resource availability prediction, that adapt to real-time states of those computing resources.

The MapReduce job scheduler adapts to real-time server dynamics and task requirements by measuring average computing resource availability in a finite time window (e.g., during a task lifetime). Time series prediction (e.g., Holt-Winters, etc.) estimates available and unavailable periods of computing resources in near future, e.g., within next 24 hours. Prajakta S. Kalekar, "Time Series Forecasting using Holt-Winters Exponential Smoothing," Kanwal Rekhi School of Information Technology, December, 2004, wholly incorporated by reference as if set forth herein, describes time series prediction using Holt-Winters Exponential Smoothing. Based on this estimated available and unavailable periods of computing resources, the MapReduce job scheduler can compute a fraction of available processing slots of computing resources until a processing time required to complete a task is achieved.

Furthermore, the MapReduce job scheduler may also use a run-time prediction module to predict a fraction of a near-future period (e.g., a next day, a following week, etc.) available processing time a computing resource can provide to a task during the lifetime of the task. The MapReduce job scheduler leverages known techniques on time series prediction, e.g., linear regression, Holt-Winters exponential smoothing, etc., to predict durations of near-future available and unavailable periods of a computing resource. This predicted available period of that computing resource indicates a fraction of processing time that the computing resource can deliver to a task during the lifetime of this task. This fraction is then used to measure the effective reduce slot that a corresponding job receives from that computing resource if its task is scheduled on that computing resource.

In one embodiment, the MapReduce job scheduler serves a plurality of tenants, i.e., a plurality of organizations, etc., with dynamically available hardware computing resources. The MapReduce job scheduler estimates, e.g., by using Ping command, etc., an effective processing speed of each computing resource in processing a Map task from each pending job, and assigns Map tasks to computing resources to maximize the number of Map slots per job, weighted by the effective processing speeds. The MapReduce job scheduler estimates, based on the placement of Map tasks, an effective processing speed of each computing resource in processing a Reduce task from each pending job and assigns Reduce tasks to computing resources to maximize the number of Reduce slots per job, weighted by the effective processing speeds of computing resources.

In assigning of Reduce tasks, if there exists more than one assignment with comparable number of reduce slots per job, the MapReduce job scheduler selects the assignment that maximizes total number of reduce slots, weighted by effective processing speeds of those computing resources. In assigning of Reduce tasks, if there exist multiple assignments with comparable total weighted reduce slots, the MapReduce job scheduler selects one assignment that maximizes the number of jobs processed by the computing resources. The MapReduce job scheduler reserves a specific number of computing resources dedicated to mainly process Reduce tasks.

In one embodiment, the MapReduce job scheduler iterates the assignment of Map and Reduce tasks for more than one time, i.e., to iteratively adjust Map task assignment under previously assigned Reduce tasks so that the total number of (weighted) Map slots is maximized under the fairness constraint. Then, the MapReduce job scheduler adjusts the assignment of Reduce tasks under previously assigned Map tasks so that the total number of (weighted) Reduce slots is maximized under the fairness constraint.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving performance and fairness in sharing a cluster of dynamically available computing resources among multiple jobs, the method comprising:
    collecting at least one parameter associated with availability of a plurality of computing resources;
    based on said collected at least one parameter, obtaining an effective processing speed of the computing resource, said effective processing speed measured as a fraction of available processing slots over a total number of processing slots for each resource;
    assigning a weight to one or more processing slots in each of the plurality of computing resources according to said effective processing speed of the computing resource;
    calculating, based on the assigned weight, an effective processing time that each computing resource can provide to each job; and
    allocating, based on the calculated effective processing time, the plurality of computing resources to the multiple jobs, whereby the multiple jobs are completed at a same time or an approximate time, wherein a processor coupled to a memory device runs the collecting, the obtaining, the assigning, the step of calculating and the step of allocating.

2. The method according to claim 1, wherein the collected parameter includes one or more of:
    long-term availability of the plurality of computing resources, instantaneous availability of the plurality of computing resources, an average available period of the plurality of computing resources, an average unavailable period of the plurality of computing resources.

3. The method according to claim 1, wherein the computing resource includes one or more of:
    a server computer, a mainframe computer, a laptop computer, a desktop computer, a tablet computer, and a netbook computer.

4. The method according to claim 1, wherein for each job with a similar workload, the allocating includes steps of:
    determining, among the computing resources, at least one computing resource whose performance is lower than a pre-determined standard;
    determining, among the computing resources, at least one computing resource whose performance is higher than the pre-determined standard; and
    assigning a mix of the low-performance computing resources and the high-performance computing resources to each job to result in each job receiving equal amount of effective processing time.

5. The method according to claim 1, wherein each job is a MapReduce job.

6. The method according to claim 1, wherein the step of allocating includes steps of:
    assigning a weight to each job;
    distributing the computing resources to each job in order to maximize a minimum normalized processing time across all the jobs, the minimum normalized processing time being calculated by dividing a processing time given to a corresponding job by the weight assigned to the corresponding job.

7. The method according to claim 6, further comprising:
    repeating the collecting, the calculating and the allocating in order to maximize fairness across the jobs, the fairness representing that a sum of the calculated effective processing time given to a job is same for all jobs.

8. A system for improving performance and fairness in sharing a cluster of dynamically available computing resources among multiple jobs, the system comprising:
    a memory device;
    a processor coupled to the memory device is configured to perform:
        collecting at least one parameter associated with availability of a plurality of computing resources;
        based on said collected at least one parameter, obtaining an effective processing speed of the computing resource, said effective processing speed measured as a fraction of available processing slots over a total number of processing slots for each resource;
        assigning a weight to one or more processing slots in each of the plurality of computing resources according to said effective processing speed of the computing resource;
        calculating, based on the assigned weight, an effective processing time each computing resource can provide to each job; and
        allocating, based on the calculated effective processing time, the plurality of computing resources to the multiple jobs, whereby the multiple jobs are completed at a same time or an approximate time.

9. The system according to claim 8, wherein the collected parameter includes one or more of:
    long-term availability of the plurality of computing resources, instantaneous availability of the plurality of computing resources, an average available period of the plurality of computing resources, an average unavailable period of the plurality of computing resources.

10. The system according to claim 8, wherein the computing resource includes one or more of:
    a server computer, a mainframe computer, a laptop computer, a desktop computer, a tablet computer, and a netbook computer.

11. The system according to claim 8, wherein for each job with a similar workload, in order to perform the step of allocating, the processor is further configured to perform steps of:
  determining, among the computing resources, at least one computing resource whose performance is lower than a pre-determined standard;
  determining, among the computing resources, at least one computing resource whose performance is higher than the pre-determined standard; and
  assigning a mix of the low-performance computing resources and the high-performance computing resources to each job to result in each job receiving equal amount of effective processing time.

12. The system according to claim 8, wherein each job is a MapReduce job.

13. The system according to claim 8, wherein in order to perform the step of allocating, the processor is further configured to perform steps of:
  assigning a weight to each job;
  distributing the computing resources to each job in order to maximize a minimum normalized processing time across all the jobs, the minimum normalized processing time being calculated by dividing a processing time given to a corresponding job by the weight assigned to the corresponding job.

14. The system according to claim 13, further comprising:
  repeating the collecting, the calculating and the allocating in order to maximize fairness across the jobs, the fairness representing that a sum of the calculated effective processing time given to a job is same for all jobs.

15. A computer program product for improving performance and fairness in sharing a cluster of dynamically available computing resources among multiple jobs, the computer program product comprising a non-transitory storage medium readable by a processing circuit and storing instructions run by the processing circuit for performing a method, said method steps comprising:
  collecting at least one parameter associated with availability of a plurality of computing resources;
  based on said collected at least one parameter, obtaining an effective processing speed of the computing resource, said effective processing speed measured as a fraction of available processing slots over a total number of processing slots for each resource;
  assigning a weight to one or more processing slots in each of the plurality of computing resources according to said effective processing speed of the computing resource;
  calculating, based on the assigned weight, effective processing time each computing resource can provide to each job; and
  allocating, based on the calculated effective processing time, the plurality of computing resources to the multiple jobs, whereby the multiple jobs are completed at a same time or an approximate time.

16. The computer program product according to claim 15, wherein for each job with a similar workload, said allocating comprises:
  determining, among the computing resources, at least one computing resource whose performance is lower than a pre-determined standard;
  determining, among the computing resources, at least one computing resource whose performance is higher than the pre-determined standard; and
  assigning a mix of the low-performance computing resources and the high-performance computing resources to each job to result in each job receiving equal amount of effective processing time.

* * * * *